United States Patent [19]

Katoh

[11] E Re. 28,998

[45] Reissued Oct. 5, 1976

[54] BROAD-BAND LUMPED-ELEMENT CIRCULATOR

[75] Inventor: Hidehiko Katoh, Tokyo, Japan

[73] Assignee: Nippon Electric Company, Ltd., Tokyo, Japan

[22] Filed: Oct. 17, 1975

[21] Appl. No.: 623,390

Related U.S. Patent Documents

Reissue of:

[64] Patent No.: 3,895,320
Issued: July 15, 1975
Appl. No.: 448,556
Filed: Mar. 6, 1974

[30] Foreign Application Priority Data

Mar. 27, 1973 Japan ..... 48-35449
Mar. 27, 1973 Japan ..... 48-37659
Mar. 28, 1973 Japan ..... 48-38214

[52] U.S. Cl. ..... 333/1.1; 333/84 M
[51] Int. Cl.[2] ..... H01P 1/38

[58] Field of Search ..... 333/1.1

[56] References Cited

UNITED STATES PATENTS 3,522,555 8/1970 Hashimoto et al. ..... 333/1.1
3,818,381 6/1974 Konishi et al. ..... 333/1.1

*Primary Examiner*—Paul L. Gensler
*Attorney, Agent, or Firm*—Ostrolenk, Faber, Gerb & Soffen

[57] ABSTRACT

A circulator preferably fabricated using thin film techniques. Broad-band isolation and insertion loss characteristics are obtained in the gigahertz frequency range by replacing the conventional series resonant circuit typically employed in circulation, with three symmetrically arranged lumped parameter LC circuits fabricated by thin-film techniques and having the junctions of the LC elements interconnected through conductive paths, such as inductors, for example.

7 Claims, 9 Drawing Figures

BROAD-BAND LUMPED-ELEMENT CIRCULATOR

Matter enclosed in heavy brackets [ ] appears in the original patent but forms no part of this reissue specification; matter printed in italics indicates the additions made by reissue.

The present invention relates to lumped-element circulators, and more particularly to broad-band lumped-element circulators for applications at microwave frequencies, the circulator being miniaturized by thin-film techniques used in the fabrication of integrated circuits.

BACKGROUND OF THE INVENTION

With the constantly developing integration of microwave circuits, there has been a growing demand for small, inexpensive circulators. Since an intermediate frequency of 1.7 GHz was determined in Japan for millimeter wave PCM (pulse code modulation) communication systems, the need for circulators adaptable to high frequency bands at this intermediate frequency has been on the rise. There have been several proposals on how to attain higher frequencies and broader bands for circulators developed for VHF or UHF bands.

One proposal, made by R. H. Knerr of Bell Telephone Laboratories, Inc. at the International Microwave Symposium held in Dallas, Texas in May 1969, suggests the use of thin-film techniques applied in the fabrication of semiconductor integrated circuits, to obtain higher microwave frequencies for the circulator. The lumped-element circulator used according to the proposal consists essentially of strip lines comprising several crossovers, which are formed on a ferrite disk. This approach led to a marked increase in the upper limit of the frequency at which the circulator can operate, although a substantially wide band was not obtainable. To broaden the bandwidth, R. H. Knerr et al. proposed an improvement on the circulator to comprise capacitance formed by thin-film techniques, on the back of the ferrite disk, i.e., one of the two main surfaces of the ferrite disk where no strip lines are formed. (Reference: IEEE Transactions on Microwave Theory and Technique, Vol. MTT-18, No. 12, December 1970). According to this improvement, however, the specific bandwidth of the circulator is still insufficient; for example, the ratio of frequency band where an isolation of 20 db can be obtained, to the center frequency is about 30 percent at best.

Y. Konishi et al. proposed another improvement on the circulator using an LC series circuit as a discrete element instead of the capacitance formed on the back of the ferrite disk. This improvement, however, is not very workable in broadening the bandwidth of a UHF band because, as will be described, the single LC resonant circuit does not function as a symmetrical circuit on the back of the ferrite disk. (Reference: IEEE Transactions on Microwave Theory and Technique. Vol. MTT-19, No. 3, March 1971).

BRIEF DESCRIPTION OF THE INVENTION AND OBJECTS

Studying the prior art approaches, the inventors of the present invention found the fact that the microwave frequency bandwidth can be broadened by splitting Konishi's LC series circuit into three components as in the microwave strip circuit on the top surface of the ferrite disk and by forming these components into a distributed constant circuit by thin-film techniques. (Reference: Rec. Professional Group on Microwaves, No. MW 72–89, Oct. 26, 1972, issued by The Institute of Electronics and Communication Engineers of Japan). This improvement served to increase the specific bandwidth to a value higher than 40 percent. On the other hand, however, a complex series resonant circuit is formed among the three-component LC series circuits on the back of the ferrite disk, as will be described later, causing the isolation and insertion loss characteristics to be largely deformed within the frequency band used.

Accordingly, a general object of the invention is to provide a microwave band lumped-element circulator miniaturized by the use of thin-film techniques and made operable over a broader microwave frequency band and exhibiting flat isolation and insertion loss characteristics.

BRIEF DESCRIPTION OF THE FIGURES

The other objects, features and advantages of the invention will become more apparent from the following description taken in conjunction with the accompanying drawings wherein.

DETAILED DESCRIPTION OF THE INVENTION

Figure 1:
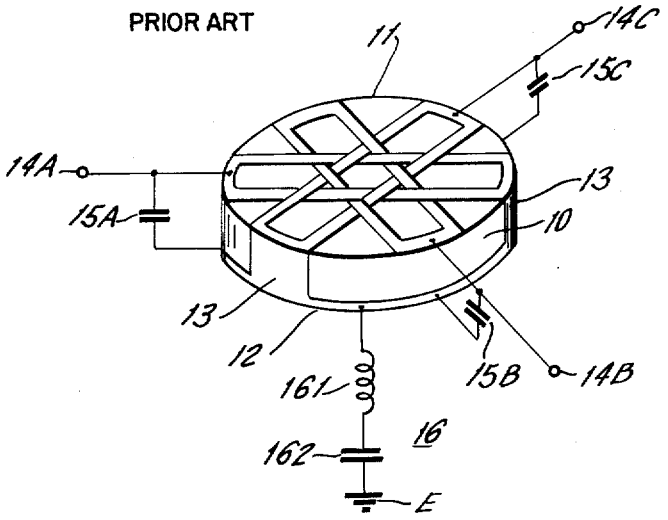
FIG. 1. PRIOR ART
FIG. 1 is a perspective view showing the conventional lumped-element circulator proposed by Konishi et al.

Referring to FIG. 1, there is shown one conventional circulator proposed by Konishi et al., which comprises a ferromagnetic ferrite substrate 10; a center conductor element 11 formed on the top surface of the substrate 10 by way of a zero-capacitance-insulated crossover and having three arms 120° apart from each other; an outer conductor element 12 formed on the entire back surface of the substrate; thin-film strips 13 connecting the three arms at every other end to the outer conductor element 12; input/output terminals 14A, 14B and 14C each respectively connected to one of the three arms on the side opposite to the thin-film strips 13; shunting capacitors 15A, 15B and 15C for shunting the input/output terminals to the outer conductor element 12; and a series resonant circuit 16 inserted in series between the outer conductor element 12 and the ground E. The resonant circuit 16 comprises such lumped-constant circuit elements as an inductor 161 and a capacitor 162. The aim of this circulator is to achieve wide-banding effects by utilizing the shunting capacitors 15A through 15C of the individual input-/output ports, in combination with the series resonant circuit 16. However, because the inductor 161 is included in the single resonant circuit 16 there are difficulties in symmetrically maintaining the isolation characteristic and the insertion loss characteristic in the UHF region above 1 GHz. Accordingly the upper limit of the usable frequency remains comparatively low. For example, in the 1 GHz region, the specifc band of a frequency region where the symmetry of the characterstics can be obtained is as low as about 13 percent.

Figure 2:
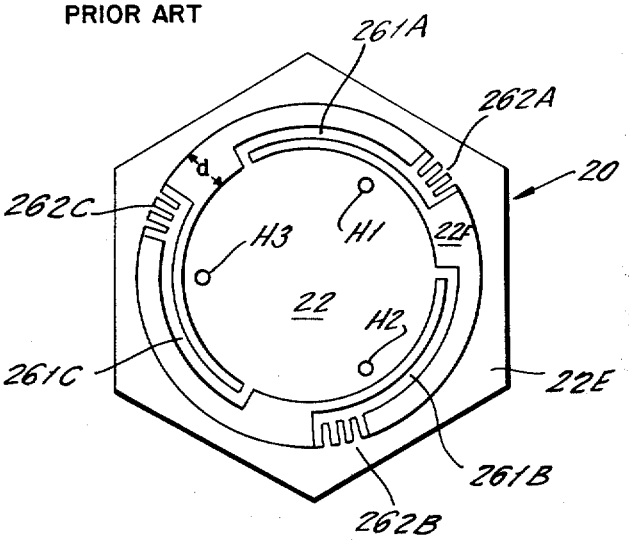
FIG. 2. PRIOR ART
FIG. 2 is a bottom plan view showing a ferrite disk of the circulator as in FIG. 1, proposed by the inventors.

The reason why the upper limit of the frequency range is low in the circulator proposed by Konishi et al. is because the discrete inductor 161 of the series resonant circuit 16 adversely affects the symmetry of the circulator. To solve this problem, the inventors of this invention proposed the arrangement that the inductor 161, together with the capacitor 162, is slit into three components, which are installed on the back main surface of the ferrite substrate 10, surrounding the outer conductor element 12 (Reference is made to the foregoing data issued by The Institute of Electronics and Communication Engineers of Japan). FIG. 2 briefly illustrates by bottom plan view the essential part on the ferrite substrate used for the purpose of the invention.

In FIG. 2, an LC series broad-banding circuit formed on the back main surface of a ferrite substrate 20 by thin-film techniques comprises: a circular main conductor film 22 connected by way of three through-holes $H_1$, $H_2$ and $H_3$ to three arms (which correspond to three arms of center conductor 11 in FIG. 1) of the center conductor on the top main surface of the ferrite substrate 20, a substantially annular shaped grounding conductor film 22E surrounding center conductor 22 and being spaced therefrom by a predetermined distance d from the circumference of main conductor film 22, concentrically arranged inductive arms 261A, 261B and 261C formed integrally with the conductor film 22 in the same process in an exposed region 22F of the width d between the conductor film 22 and the grounding conductor film 22E; and interleaved finger capacitive element portions 262A, 262B and 262C linked with the grounding conductor 22E at the ends of inductive arms 261A, 261B and 261C. These inductive and capacitive arms 261A through 261C and 262A through 262C are arranged at 120° intervals relative to one another when viewed from the center of the conductor film 22. The arms 261A through 261C and 262A through 262C are formed concurrently with the conductor films 22 and 22E in a thin-film forming process.

Figure 3:
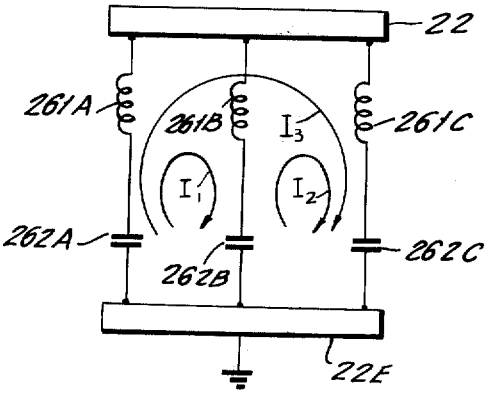
FIG. 3. PRIOR ART
FIG. 3 is an equivalent circuit diagram of a three-component LC series resonant circuit formed on the back of the ferrite disk shown in FIG. 2.

FIG. 3 shows an equivalent circuit of the outer conductor arrangement wherein three series resonant circuits 261A–262A, 261B–262B and 261C–262C are inserted between the main conductor film 22 and the grounding conductor film 22E. As apparent from the equivalent circuit, there are three complex series resonant circuits formed at the same time, that is, a first complex series resonant circuit $I_1$ comprising 261A–26-2A–262B–261B, a second complex series resonant circuit $I_2$ comprising 261B–262B–262C–261C, and a third complex series resonant circuit $I_3$ comprising 261A–262A–262C–261C. In this construction, however, a parasitic resonant circuit is formed, with the result that flat isolation and insertion loss characteristics can hardly be obtained by merely depending on the circuits shown in FIGS. 2 and 3.

Figure 4:
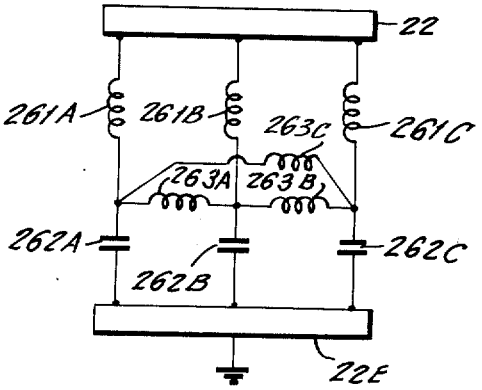
FIG. 4 is an equivalent circuit diagram similar to FIG. 3, showing an embodiment of the invention, which comprises a means for precluding the problems attendant on the prior art illustrated in FIG. 3.

As a result of studying possibilities of reducing the effect of the parasitic resonant circuit, the inventors of this invention have found an effective arrangement as indicated by an equivalent circuit shown in FIG. 4. This arrangement is such that the LC connection points of the series resonant circuits 261A–262A. 261B–262B and 261C–262C are shunted by inductors 263A. 263B and 263C respectively. By giving the inductances of these inductors as small values as possible (the inductance values can be nearly zero under a short-circuit state), the effect of the parasitic resonant circuit can be substantially removed.

Figure 5:
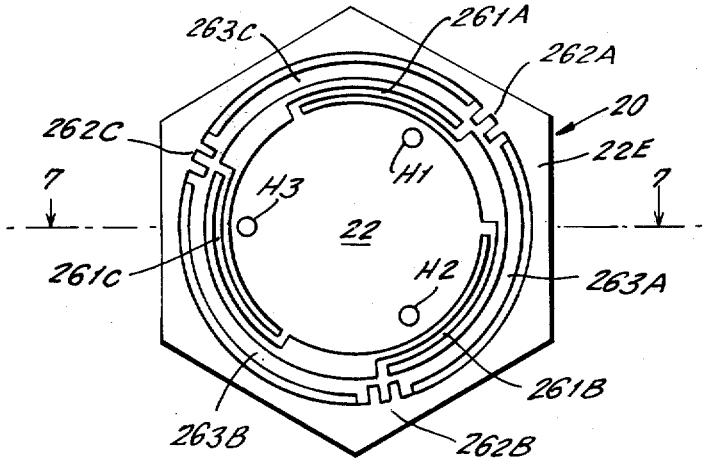
FIG. 5 is a bottom plan view similar to FIG. 2, corresponding to the equivalent circuit shown in FIG. 4.

FIG. 5 is a bottom plan view of a ferrite substrate 20 as in FIG. 2, which is embodied from the equivalent circuit in FIG. 4 by the use of thin-film techniques. In FIG. 5, the connection points of inductor arms 261A, 261B and 261C, and capacitor arms 262A, 262B and 262C are shunted by inductive shunting elements 263A, 263B and 263C respectively. It is apparent to those skilled in the art that these conductor thin-film elements are formed concurrently in one process by the known thin-film techniques.

Figure 6:
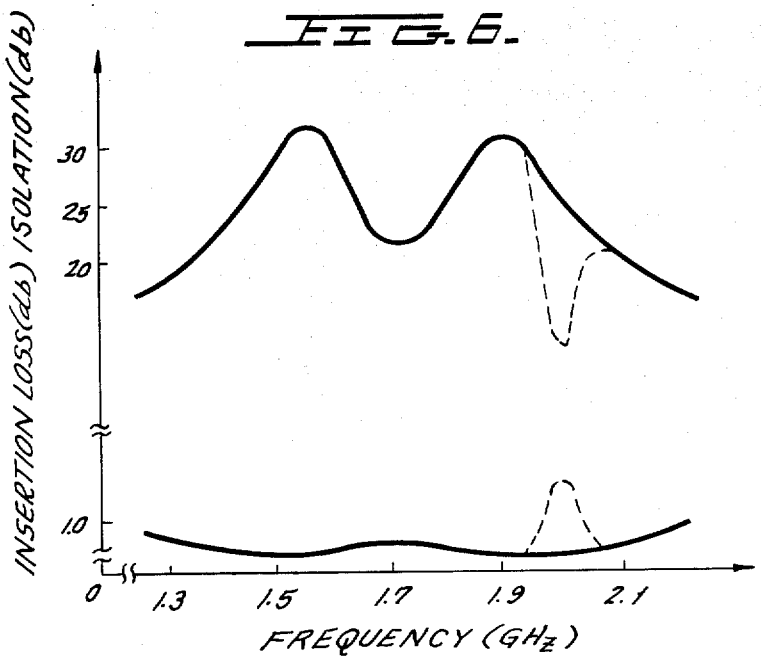
FIG. 6 is a diagram showing isolation/insertion losses vs. frequency characteristics for illustrating the effects of the invention.

FIG. 6 shows isolation and insertion losses vs. frequency characteristics according to the invention, in comparison with the prior art characteristics. In FIG. 6, the abscissa stands for frequencies in gigahertz (GHz), the ordinate for isolation and insertion losses in decibel (db), the solid line for the characteristic of the embodiment as in FIG. 5, and the dotted line for the characteristic according to the prior art as in FIG. 2, FIG. 6 indicates the fact that the prior art characteristic curve is largely varied in the frequency band used, as opposed to a flat curve obtained according to the invention.

Figure 7:
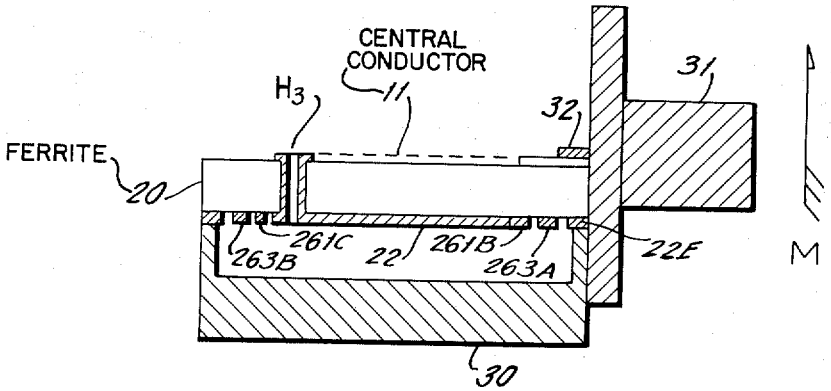
FIG. 7 is a longitudinal sectional view showing the ferrite disk as in FIG. 5 mounted in a housing.

FIG. 7 is a sectional view of the embodiment of FIG. 5 taken across the dot-dash line 7 away from the arrow-marked direction, showing the construction of a practical circulator mounted in a housing. This circulator comprises a ferrite substrate 20 having a thin-film outer conductor arrangement (FIG. 5). In FIG. 7, the ferrite substrate 20 is fitted to a conductor housing member 30 on the grounding conductor film 22E. This ferrite substrate 20, on the other hand, is connected to a center conductor 32 of a connector 31 (which is to serve as an input/output terminal) on the surface where a central conductor 11 is formed. The housing member 30 and the connector 31 are integrally united by soldering or the like along their mating surfaces. To operate this circulator, a static magnetic field is applied in the direction indicated by arrow M. The ferrite substrate 20 is mounted in the housing member 30 in the manner well-known to those skilled in the art, which therefore is not described further for purposes of simplicity.

Figure 8:
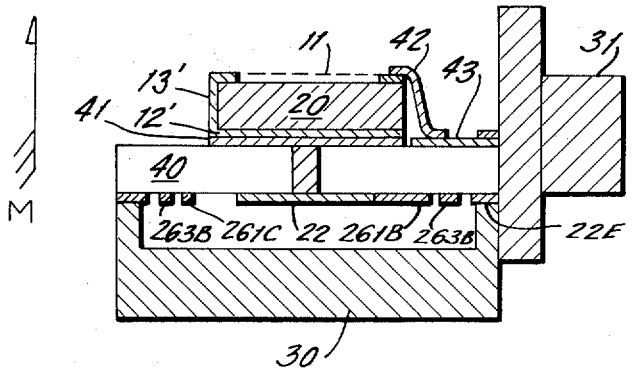
FIG. 8 is a longitudinal sectional view showing another example of ferrite disk mounted in a housing.

In the first embodiment of the invention shown in FIG. 5, the conductor thin film pattern which is one element characterizing this invention, is formed directly on the back surface of the ferrite substrate 20. This thin-film pattern may be formed on a suitable substrate such as ceramic substrate if the circulator is required to be related to an external circuit. An example of this construction is illustrated by a sectional view shown in FIG. 8. Like references denote like components throughout FIGS. 2, 7 and 8, and references with primes in FIG. 8 indicate components corresponding to those in FIGS. 2 and 7. In FIG. 8, a thin-film circuit pattern as shown in FIG. 5, which uniquely characterizes this invention, is formed on the back surface of a ceramic substrate 40. A metallized portion 41 is formed on the top surface of the ceramic substrate 40. A conductive film 12' is formed on the entire surface of the bottom of the ferrite substrate 20, which is then installed on the metallized portion 41 by soldering or the like. In this process, an axial through-hole may be formed at the center of the ceramic substrate, through which the conductor films 12' and 22 are electrically connected to each other. One end of each arm of the central conductor is connected to the conductive film 12' by a shunt conductor 13', and the input/output terminal of each arm is led through a conductor strip 42 to an electrode member 43 on the ceramic surface and is then connected to the central conductor of the connector 31. To operate this circulator, a static magnetic field M is applied in the upward direction perpendicular to the plane of drawing.

Figure 9:
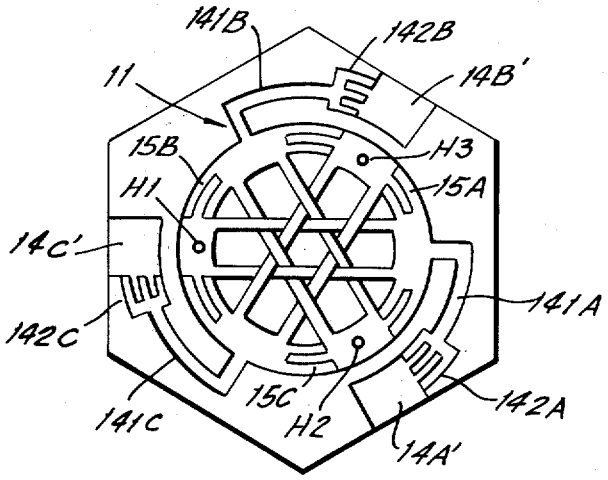
FIG. 9 is a plan view showing a ferrite disk on which three input arms are installed, each comprising an LC series circuit, for the purpose of broadening the frequency band used.

According to the invention, as described above, the frequency band applicable to the circulator is broadened by controlling the conductor thin-film pattern of the outer conductor formed on the side opposite to the central conductor of three arms. The band-broadening effect can be enhanced when the conventional broadbanding method in which LC series resonant circuits are connected in series to the individual input/output ports is used with the circulator construction of this invention. FIG. 9 shows by plan view an example of the shape of central conductor 11 used for this arrangement. In FIG. 9, series resonant circuits as shown in FIGS. 2 and 5 are formed between the three arms of central conductor 11 with shunting capacitors 15A, 15B, 15C 15 and the input/output ports 14A', 14B' and 14C' (note: The method of broadening the band by the use of series resonant circuits in the input/output ports as is described in the foregoing proposal by R. H. Knerr. Hence, no further description thereof will be given herein). Alternatively, the series resonant circuits may be formed on a ceramic plate, which may be stacked with the ferrite plate to permit those resonant circuits to surround the center conductor.

According to the invention, as has been described in detail, the LC series circuit of the outer conductor is split into three components, the connection points of the three-component series resonant circuits are shunted by inductors, and these circuit elements are formed by thin-film techniques whereby a circulator operator at a higher frequency and in a broader frequency band is realized.

While a preferred embodiment of the invention and several modifications thereof have been described, it is particularly understood that the invention is not limited thereto or thereby.

What is claimed is:

1. A broad-band thin-film circulator having a plate of ferromagnetic material, means creating a D.C. magnetic field transverse to said plate, at least three arms of mutually insulated thin conductor films formed on one major surface of said plate, terminal members connected respectively to one end of each of said arms; a centrally located conductive film formed on the opposite surface of said plate; means connected respectively to said conductor films for electrically connecting the other ends of said conductor film arms to said central conductive film and including resonant means including LC circuit elements and connected at one end to said central film and electrostatically coupled at the opposite end with the other ends of said conductive film arms, wherein said resonant means comprises three LC series circuit paths each comprising an inductor and capacitor; conductive elements connecting each junction between an inductor and capacitor to every other junction.

2. A circulator as claimed in claim 1, wherein said LC series circuit elements are formed of symmetrical thin film conductor patterns formed on the other major surface of said plate.

3. A circulator as claimed in claim 1, wherein said LC series circuit elements are formed on a major surface of a ceramic plate separate from said ferrite plate and coupled with said ferrite plate.

4. A circulator comprising a substantially disc-shaped body of ferromagnetic material;

means creating a D.C. magnetic field transverse to said body;

a thin-film conductive pattern formed on one face of said body said pattern comprising three conductive arms arranged at predetermined equal angles relative to one another;

a circular shaped conductive thin-film formed on the opposite face of said body;

means connecting one end of each arm to said circular-shaped thin-film;

an annular conductive thin-film formed on said opposite face and surrounding said circular shaped thin-film, the thin-films defining an annular space therebetween;

a plurality of thin-film LC circuit paths arranged at predetermined locations within said annular space, each path containing first and second lumped parameter circuit elements joined to one another;

one end terminal of each circuit path being connected to said circular thin-film and the opposite end terminal of each circuit path being connected to said annular shaped thin-film;

a thin-film conductive pattern formed in said annular space for electrically interconnecting the junctions between the first and second lumped parameter elements of each of said series circuits.

5. The circulator of claim 4 wherein said thin-film conductive pattern in said annular space comprises a plurality of inductors each of said inductors being connected between the junctions of a pair of said circuit paths.

6. The circulator of claim 5 wherein first, second and third series circuit paths are provided and are arranged at equi-spaced intervals about said annular space;

said plurality of inductors comprising first, second and third inductors arranged at equi-spaced intervals about said annular space and each being electrically connected between the junctions of two associated ones of said series circuit paths.

7. The circulator of claim 6 wherein each of said series circuit paths comprises series connected inductance and capacitance elements.

* * * * *